Dec. 12, 1961 W. E. THIEL 3,012,537
CRANE BOOM LOAD, HEIGHT, RADIUS AND ELEVATION INDICATOR
Filed Aug. 8, 1960 2 Sheets-Sheet 1
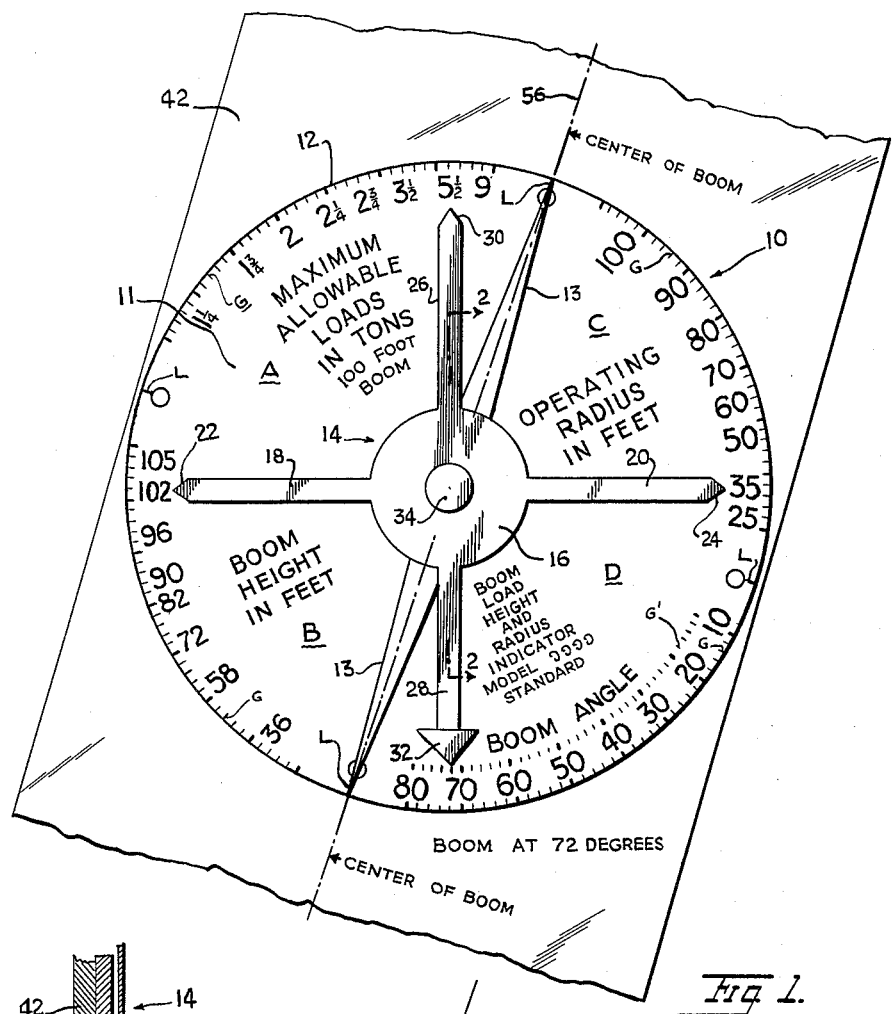
Fig. 1.
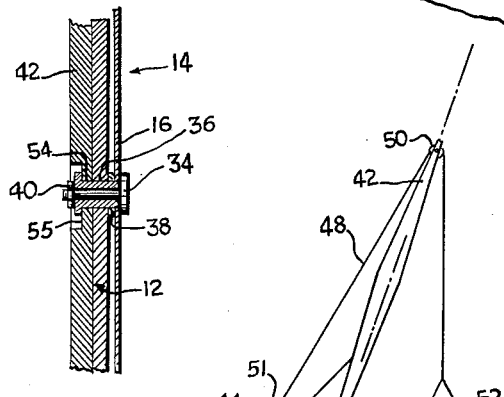
Fig. 2.
Fig. 3.
INVENTOR.
WALTER E. THIEL
BY
ATTORNEY

INVENTOR.
WALTER E. THIEL
BY
ATTORNEY

United States Patent Office 3,012,537
Patented Dec. 12, 1961

3,012,537
CRANE BOOM LOAD, HEIGHT, RADIUS AND ELEVATION INDICATOR
Walter E. Thiel, 3200 Netherland Ave., New York 63, N.Y.
Filed Aug. 8, 1960, Ser. No. 48,060
2 Claims. (Cl. 116—124)

This invention relates to the art of indicating the load, height, operating radius, elevation and angular degree of a crane boom, and more particularly to an improved indicator for this purpose.

The principal objects of the present invention is to provide an indicator that simultaneously indicates the maximum allowable loads in tons at all boom angles used; for automaticaly indicating the height of boom in feet at all boom angles used; for simultaneously indicating the operating radius in feet at all boom angles used; and for simultaneously indicating graphically the boom elevation at all angles used.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a plan view of an indicator embodying my invention shown applied diagrammatically to the boom of a crane.

FIG. 2 is a sectional view on the line 2—2 of FIG. 1.

FIG. 3 is a part elevational and part diagrammatic view of a crawler type lifting crane.

Figure 4:
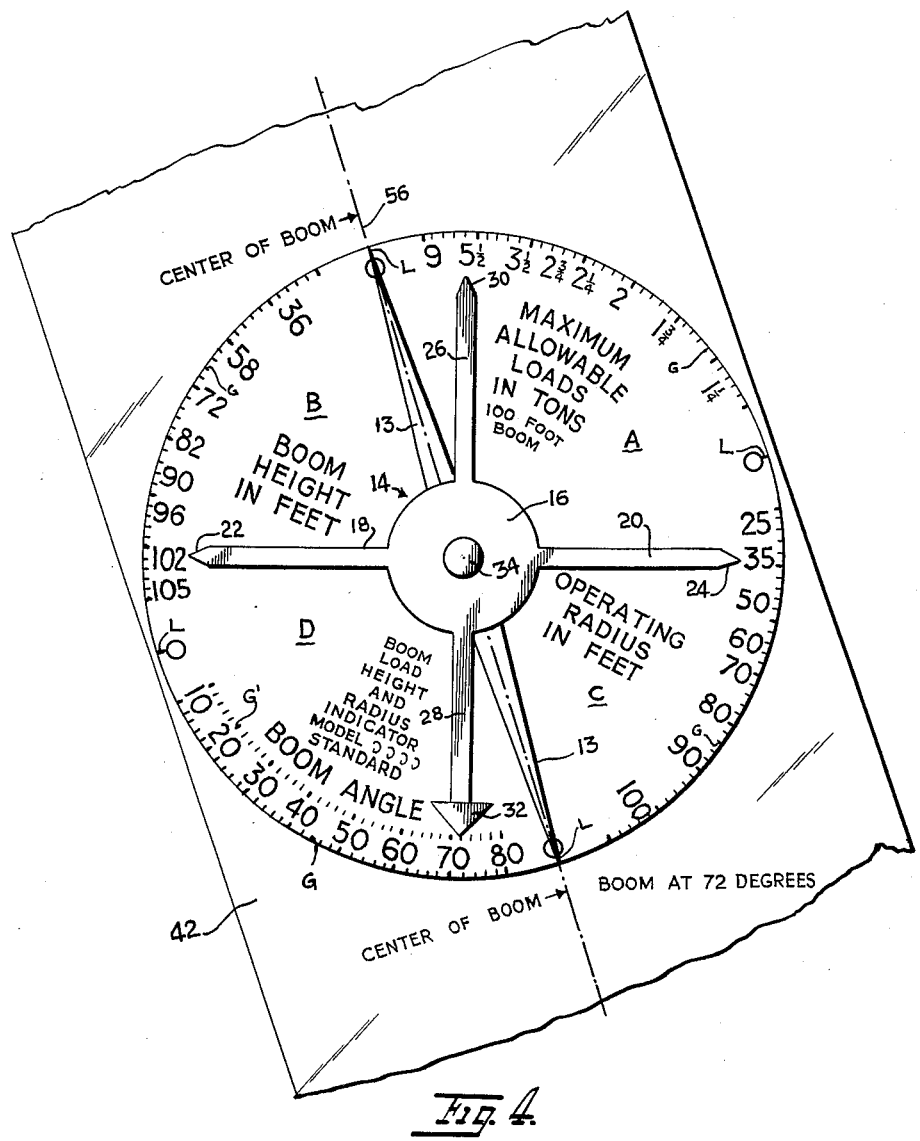
FIG. 4 is a view similar to FIG. 1 but showing graduations located at right side of an engineer's control.

Referring in detail to the drawings, in FIG. 1 an indicator embodying my invention is shown and designated generally by the reference numeral 10. The indicator 10 comprises a thin circular disk-shaped body 12 with opposed flat faces, and is composed of metal, wood, plastic or any other suitable material. One face 11 of the body is divided into four quadrants or sections by means of lines L spaced along the periphery thereof, embracing four arcs of ninety degrees each, the sections being marked "A," "B," "C" and "D." Each section includes a scale divided by short lines indicated at G into spaces or graduations of two and ten degrees, along the periphery of the body.

In section A the graduated lines are numbered or marked "0," "1¼," "1¾," "2," "2¼," "2¾," "3½," "5½," "9." These represent tons and indicate or measure the weight of the maximum allowable loads of the booms in tons.

In section B, the graduated lines are marked "36," "58," "72," "82," "90," "96," "102," "105." These represent feet and indicate or measure the height of the boom in feet.

In section C, the graduate lines are marked "25," "35," "50," "60," "70," "80," "90," "100." These represent feet and indicate or measure the operating radii of the boom in feet.

In section D, the graduated lines are marked "0," "10," "20," "30," "40," "50," "60," "70," "80." These represent degrees and indicate or measure the load, height and radius of the boom. In section D, inwardly of the graduated lines G, another arcuate line of similar short lines G' registering with the outer lines G is provided. These inner lines G' indicate or measure the boom angle.

On the face 11 of the disk, there is also a diagrammatic illustration or picture 13 of a boom in miniature, extending diametrically across the center of the disk between adjacent ends of sections A, C and B, D.

Associated with and movable relative to the face 11 of the body 12 of the indicator 10 there is an indicating device 14 having a disk-shaped body 16 with a pair of opposed arms 18 and 20 having pointed ends 22 and 24, respectively. At points ninety degrees from the arms 18 and 20 and in opposed relation to each other and integral with the disk-shaped body 16 there is an arm 26 and an arm 28. The arm 26 terminates in a pointed end 30 and the arm 28 terminates in a triangular-shaped weighted end 32. The indicating device 14 may be formed of metal, wood, plastic or any other suitable material.

The shaft means for mounting the indicating device 14 on the body 12 of the indicator comprises a headed bolt 34 passing through an opening in the center of the disk-shaped body 16 and loosely through an opening in the center of the body 12 of the indicator. A flanged bushing 36 is sleeved around the shank of the bolt and a spacing washer 38 is interposed between the body 16 and the body 12. A nut 40 on the threaded end of the bolt secures the parts together.

In use, the indicator 10 is adapted to be mounted on the boom of a crane such as the boom 42 of the crane 44 shown in FIG. 3. The illustrated crane 44 is of conventional crawler type construction with the boom 42 swingably mounted on the frame 46 and with the wire rope 48 passing over a wheel 50 on its way from the winch 51 or the like. The wire rope hoists or lowers a load such as the weight 52.

The indicator 10 is shown fastened to the boom 42 by extending the bolt 34 and bushing 36 through an opening 54 in a countersunk portion 55 of the boom in the longitudinal center axial line of the boom 42 as indicated as 56 in FIG. 1, with the flange of the bushing seated on the outer surface of the boom and the nut 40 secured to the end of the bolt and against the flange of the bushing as shown in FIG. 2.

The indicating device 14 is adapted to turn around the face 11 of the body 12 of the indicator 10 on the bolt 34 as an axis carrying the pointed arms 18, 20, 26 and 28 therearound, across the graduations on the face of the body 12.

The crane 44 shown in FIG. 3 is shown with the boom 42 raised and in action, and for the purpose of explanation the boom is to be considered one hundred feet long and the load 52 is 5½ tons, for example. The indicator 10 is shown attached diagrammatically to the lower part of the boom at about the height of the engineer's eyes for good visibility. The arrangement of the boom 42 and disk body 12 of the indicator 10 as shown in FIG. 1 automatically provides the engineer with a complete view of the boom at all angles used and as indicated by the pointer arm 28.

When the indicator 10 is in position on the boom 42 as shown in FIG. 1, the numbers on the periphery of section A represent in tons the weight to be lifted. The pointed arm 26 is adapted to move over said section A to indicate the maximum allowable loads in tons for all angles of the boom used as specified by the manufacturer of the crane.

The numbers on the periphery of the section B represent distance in feet and the pointed arm 18 is adapted to move over said section B to indicate the height of the boom in feet.

The numbers on the periphery of the section C represent distance in feet, and the pointed arm 20 is adapted to move over said section C to indicate the operating radius of the boom in feet.

The numbers on the periphery of the section D represent degrees, and the arm 28 is adapted to move over said section D to indicate the boom angle in degrees.

In FIG. 1, the indicator 10 is shown positioned along the longitudinal center line 56 of the boom 42, and the diagrammatic illustration of the boom 13 in miniature is shown along the center line 56 at seventy-two degrees to horizontal arms 18, 20 and this arrangement of boom and indicator indicates graphically the elevation of the boom 42 at all angles of the boom used.

As seen in FIG. 1, the indicator 10 indicates the maximum allowable load for the boom 42 at 72 degrees at 5½ tons. The boom height is shown at 102 feet. The operating radius, which is the distance from the crane's center of rotation to the center of the load, is shown at 35 feet; and the center line 56 of the boom indicates the boom is positioned at an angle of seventy-two degrees.

When the boom is in operation, the indicating device 14 moves around automatically by gravity on a horizontal axis carrying the arms around in unison. The arm 26 is positioned so as to always indicate the true vertical, and the arms 18 and 20 are horizontal. When the boom is raised, the disk body 12 moves upwardly relative to indicating device 14 and the arm 18 indicates a greater boom altitude in feet, arm 20 indicates a smaller operating radius in feet, and the miniature boom in the center of the disk body graphically shows higher boom elevations.

When the boom is lowered, disk body 12 moves downwardly relative to indicating device 14 with all the pointed arms indicating lower degrees in unison, as well as a lower boom load in tons, a lower boom height in feet, a greater operating radius in feet and the miniature boom in center indicating graphically a lower boom elevation.

The construction of the indicator 10 and its position on the boom 42 as shown in FIG. 4 is similar to that shown in FIG. 1, and the miniature boom 13 is shown at seventy-two degrees to the horizontal, but the graduations on the indicator are for booms located at the right side of the crane engineer's controls.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An indicator for use with a crane boom pivotally mounted at one end to rotate on a horizontal axis in a vertical plane, comprising a flat circular body having one face thereof divided into four quadrants each extending through ninety degrees of arc, each quadrant having a scale at its periphery, the scales representing respectively maximum allowable loads for the boom, heights of the boom, operating radii of the boom, and angles of the boom; an indicating device comprising a flat disk having four coplanar arms spaced ninety degrees apart and extending radially from the disk; and shaft means mounting said disk on said circular body for free rotation by gravity when said disk and body are disposed in a vertical plane, said means mounting the center of the disk at the center of said body with said arms extending outwardly to and terminating at the respective scales, whereby the respective arms will indicate the maximum allowable load for the boom, height of the boom, operating radius of the boom and angle of the boom when said body is mounted in a vertical plane on said boom with a diameter of said body aligned parallel with the longitudinal axis of the boom.

2. An indicator for use with a crane boom pivotally mounted at one end to rotate on a horizontal axis in a vertical plane, comprising a flat circular body having one face thereof divided into four quadrants each extending through ninety degrees of arc, each quadrant having a scale at its periphery, the scales representing respectively maximum allowable loads for the boom, heights of the boom, operating radii of the boom, and angles of the boom; an indicating device comprising a flat disk having four coplanar arms spaced ninety degrees apart and extending radially from the disk; shaft means mounting said disk on said body for free rotation of the disk by gravity when said disk and body are disposed in a vertical plane, said shaft means mounting said body in a stationary position on said boom, said shaft means mounting the center of the disk at the center of said body with said arms extending outwardly to and terminating at the respective scales, whereby the respective arms will indicate the maximum allowable load for the boom, height of the boom, operating radius of the boom and angle of the boom when said body is mounted in said position on said boom in a vertical plane with a diameter of body extending between adjacent ends of opposed pairs of said scales aligned parallel with the longitudinal axis of the boom.

References Cited in the file of this patent

UNITED STATES PATENTS

| | | |
|---|---|---|
| 526,458 | Pollard | Sept. 25, 1894 |
| 1,750,962 | Lichtenberg | Mar. 18, 1930 |
| 2,418,593 | Martin | Apr. 8, 1947 |
| 2,835,220 | Rardin | May 20, 1958 |